(12) United States Patent
Dang

(10) Patent No.: US 12,298,526 B2
(45) Date of Patent: May 13, 2025

(54) LASER SYSTEM FOR GENERATING A LINEAR LASER MARKING

(71) Applicant: Hilti Aktiengesellschaft, Schaan (LI)

(72) Inventor: Lieu-Kim Dang, Gams (CH)

(73) Assignee: Hilti Aktiengesellschaft, Schaan (LI)

( * ) Notice: Subject to any disclaimer, the term of this patent is extended or adjusted under 35 U.S.C. 154(b) by 545 days.

(21) Appl. No.: 17/781,572

(22) PCT Filed: Dec. 7, 2020

(86) PCT No.: PCT/EP2020/084868
§ 371 (c)(1),
(2) Date: Jun. 1, 2022

(87) PCT Pub. No.: WO2021/122100
PCT Pub. Date: Jun. 24, 2021

(65) Prior Publication Data
US 2022/0413309 A1    Dec. 29, 2022

(30) Foreign Application Priority Data
Dec. 16, 2019    (EP) ..................................... 19216511

(51) Int. Cl.
*G01C 15/02*    (2006.01)
*G01C 15/00*    (2006.01)
*G02B 27/09*    (2006.01)

(52) U.S. Cl.
CPC ....... *G02B 27/0927* (2013.01); *G01C 15/004* (2013.01)

(58) Field of Classification Search
CPC ........................... G02B 27/0927; G01C 15/004
(Continued)

(56) References Cited

U.S. PATENT DOCUMENTS

| 3,820,903 A | * | 6/1974 | Kindl et al. | ............ E01B 35/00 356/138 |
| 4,111,564 A | | 9/1978 | Trice, Jr. | |

(Continued)

FOREIGN PATENT DOCUMENTS

| CN | 104816086 B | 1/2016 |
| DE | 102017200692 A1 | 7/2018 |

(Continued)

OTHER PUBLICATIONS

International Search Report of PCT/EP2020/084901, Jan. 15, 2021.
International Search Report of PCT/EP2020/084868, Mar. 5, 2021.

*Primary Examiner* — George B Bennett
(74) *Attorney, Agent, or Firm* — Davidson Kappel LLC

(57) ABSTRACT

A laser system (10) for generating a linear laser marking (34) on a projection surface (33), including a laser beam source (11), which generates a laser beam (25) and emits it along a propagation direction (26), a first beam shaping optical unit (12) embodied as a collimation optical unit and having a first optical axis (13), and a conical mirror (14) which is embodied as a right cone having a cone axis (15) and a reflective lateral surface (22) and is arranged in the beam path of the laser beam downstream of the collimation optical unit (12), wherein the cone axis (15) is oriented parallel to the first optical axis (13). The laser system (10) includes a second beam shaping optical unit (16), which is arranged in the beam path of the laser beam upstream of the conical mirror (14) and reshapes the laser beam into a ring beam (28) having an intensity minimum in the center of the beam.

11 Claims, 5 Drawing Sheets

(58) Field of Classification Search
USPC .......................................................... 33/286
See application file for complete search history.

(56) References Cited

U.S. PATENT DOCUMENTS

| | | | | |
|---|---|---|---|---|
| 4,327,972 A * | 5/1982 | Brunsting | .......... | G02B 27/0927 |
| | | | | 362/335 |
| 5,283,694 A * | 2/1994 | Frady | ....................... | G02B 3/02 |
| | | | | 359/719 |
| 5,764,828 A * | 6/1998 | Iga | ....................... | G01C 15/004 |
| | | | | 385/39 |
| 6,249,493 B1 * | 6/2001 | Dang | ................... | G11B 7/0909 |
| | | | | 369/112.28 |
| 6,493,067 B1 * | 12/2002 | Kodaira | ............... | G01C 15/105 |
| | | | | 356/141.2 |
| 7,497,018 B2 | 3/2009 | Hersey et al. | | |
| 7,520,062 B2 * | 4/2009 | Munroe | ............... | G01C 15/004 |
| | | | | 33/286 |
| 7,944,615 B2 * | 5/2011 | Shklover | .............. | B23K 26/064 |
| | | | | 359/629 |
| 8,023,206 B2 * | 9/2011 | Laskin | ................ | G02B 27/0927 |
| | | | | 359/399 |
| 8,402,665 B2 * | 3/2013 | Litvin | .................. | G01C 15/004 |
| | | | | 33/290 |
| 8,789,956 B2 * | 7/2014 | Dang | ................. | G02B 19/0071 |
| | | | | 359/558 |
| 8,824,052 B2 * | 9/2014 | Vetter | .................... | G02B 27/09 |
| | | | | 359/618 |
| 8,919,002 B2 * | 12/2014 | Dang | ................... | G01C 15/004 |
| | | | | 33/286 |
| 9,568,311 B2 * | 2/2017 | Dang | ................. | G02B 27/0927 |
| 10,884,250 B2 * | 1/2021 | Chen | ................. | G02B 27/0977 |
| 11,536,879 B2 * | 12/2022 | Kim | ....................... | G21K 1/003 |
| 11,815,796 B2 * | 11/2023 | Sakata | ................ | H04N 9/3164 |
| 11,933,632 B2 * | 3/2024 | Hinderling | ............... | G01C 3/08 |
| 12,147,020 B2 * | 11/2024 | Aslanov | ............ | G02B 27/0955 |
| 2012/0055035 A1 | 3/2012 | Litvin et al. | | |
| 2023/0003523 A1 * | 1/2023 | Dang | .................... | G02B 26/10 |

FOREIGN PATENT DOCUMENTS

| | | |
|---|---|---|
| DE | 102017218823 A1 | 4/2019 |
| EP | 0565904 A1 | 10/1993 |
| EP | 1903371 A1 | 3/2008 |
| EP | 2 411762 B1 | 11/2016 |
| KR | 20170071395 A | 6/2017 |
| WO | WO 2021/122108 | 6/2021 |

* cited by examiner

LASER SYSTEM FOR GENERATING A LINEAR LASER MARKING

The present invention relates to a laser system for generating a linear laser marking.

BACKGROUND

In order to carry out leveling or marking work indoors and outdoors, laser systems are known which generate a linear laser marking on a projection surface. In the case of these laser systems a distinction is drawn between rotary lasers, which generate the linear laser marking by rotation of a beam deflection optical unit about an axis of rotation, and line lasers, which generate the linear laser marking by means of a beam shaping optical unit, for example a cylindrical lens, a prism or a conical mirror. In order that the known laser systems can be used without protective measures in the form of protective goggles and reflectors, the laser power must be limited in order to prevent damage to the human eye. For laser systems in laser class 2 or 2M, the maximum permissible laser power is 1 mW.

SUMMARY OF THE INVENTION

As a result of the laser power being limited to values of less than 1 mW, known laser systems in laser class 2 or 2M have the disadvantage that the linear laser marking on the projection surface is poorly visible. It holds true here that the visibility of the linear laser marking is all the worse, the wider the laser marking on the projection surface, since the visibility decreases as the power density decreases. Moreover, the quality of the linear laser marking on the projection surface is dependent on the distance between the laser system and the projection surface.

EP 2 411 762 B1 discloses the typical set-up of a laser system for generating a linear laser marking with an opening angle of 360°. The laser system comprises a laser beam source, which generates a divergent laser beam and emits it along a propagation direction, a beam shaping optical unit, which is embodied as a collimation optical unit and reshapes the divergent laser beam into a collimated laser beam, and a conical mirror embodied as a right cone having a cone axis and a reflective lateral surface, wherein the conical mirror is arranged in the beam path of the laser beam downstream of the collimation optical unit and the cone axis is oriented coaxially with respect to the optical axis of the collimation optical unit.

The laser system known from EP 2 411 762 B1 has the disadvantage that a sharply delimited laser marking is not generated on the projection surface. The laser marking consists of a primary line and at least one secondary line. The occurrence of a plurality of lines is caused by the fact that the laser beam source generates a laser beam having a plurality of orders of diffraction which are diffracted differently at the cone vertex of the conical mirror and occur as adjacent lines on the projection surface.

An object of the present invention is to develop a laser system which makes it possible to generate a sharply delimited linear laser marking with an opening angle of 360° on a projection surface.

The present invention provides a laser system (10; 40; 60; 100) for generating a linear laser marking (34; 54; 94; 114) on a projection surface (33; 53; 93; 113), comprising:

a laser beam source (11; 61), which generates a laser beam (25; 83) and emits it along a propagation direction (26; 84), a first beam shaping optical unit (12; 62) embodied as a collimation optical unit and having a first optical axis (13; 63), and a conical mirror (14; 64) embodied as a right cone having a cone axis (15; 65) and a reflective lateral surface (22; 77), wherein the conical mirror (14; 64) is arranged in the beam path of the laser beam downstream of the collimation optical unit (12; 62) and the cone axis (15; 65) is oriented parallel to the first optical axis (13; 63), characterized in that the laser system (10; 40; 60; 100) comprises a second beam shaping optical unit (16; 66) having a second optical axis (17; 67), wherein the second beam shaping optical unit (16; 66) is arranged in the beam path of the laser beam upstream of the conical mirror (14; 64) and reshapes the laser beam into a ring beam (28; 45; 86; 105) having an intensity minimum in the center of the beam.

According to the invention, the laser system is characterized in that the laser system comprises a second beam shaping optical unit having a second optical axis, wherein the second beam shaping optical unit is arranged in the beam path of the laser beam upstream of the conical mirror and reshapes the laser beam into a ring beam having an intensity minimum in the center of the beam. The laser system according to the invention makes it possible to generate a sharply delimited linear laser marking with an opening angle of 360° on a projection surface. The second beam shaping optical unit of the laser system according to the invention reshapes the laser beam into a ring beam having an intensity minimum in the center of the beam. The intensity minimum of the ring beam affords the possibility of reducing diffraction effects at the cone vertex, the reduction of the diffraction effects resulting in a sharply delimited linear laser marking. In order to reduce the diffraction effects, the ring beam should be oriented such that the intensity minimum of the ring beam coincides with the cone axis of the conical mirror.

Preferably, the second optical axis of the second beam shaping optical unit is arranged coaxially with respect to the cone axis of the conical mirror. By virtue of the coaxial arrangement of the second optical axis and the cone axis, the intensity minimum of the ring beam lies on the cone axis and diffraction effects at the cone vertex of the conical mirror are reduced, such that a sharply delimited laser marking is generated on the projection surface.

Preferably, the second beam shaping optical unit is embodied as a diffraction grating. The embodiment of the second beam shaping optical unit as a diffraction grating has the advantage that the beam shaping properties of the diffraction grating can be adapted to the wavelength and the beam diameter of the laser beam for example by means of the parameters "grating shape", "grating width" and "grating height". The second optical axis of the diffraction grating is defined as a straight line which runs through the center of the diffraction structures and is perpendicular to the surface of the diffraction grating.

In a further development, the second beam shaping optical unit is arranged in the beam path of the laser beam between the laser beam source and the first beam shaping optical unit. The arrangement of the second beam shaping optical unit embodied in particular as a diffraction grating upstream of the collimation optical unit has the advantage that a propagation plane downstream of the conical mirror that does not extend perpendicularly to the cone axis can be corrected by means of the collimation optical unit. If the collimation optical unit is adjustable parallel to the first optical axis, the angle of incidence of the ring beam on the lateral surface of the conical mirror and the orientation of the propagation plane in which the laser beam passes downstream of the conical mirror.

In a preferred first variant, the first beam shaping optical unit is embodied as adjustable parallel to the first optical axis. A first beam shaping optical unit that is adjustable parallel to the first optical axis has the advantage that the angle of reflection of the ring beam and the orientation of the propagation plane in which the laser beam passes downstream of the conical mirror can be altered. The aim is to generate by means of the conical mirror a propagation plane that extends perpendicularly to the cone axis. The orientation of the propagation plane is defined by the angle of reflection of the laser beam, which is dependent on the angle of incidence of the ring beam.

In a preferred second variant, the second beam shaping optical unit is embodied parallel to the second optical axis. An adjustable second beam shaping optical unit that is adjustable parallel to the second optical axis has the advantage that the angle of incidence of the ring beam and the orientation of the propagation plane in which the laser beam passes downstream of the conical mirror can be altered. The aim is to generate by means of the conical mirror a propagation plane that extends perpendicularly to the cone axis. The orientation of the propagation plane is defined by the angle of reflection of the laser beam, which is dependent on the angle of incidence of the ring beam.

In a preferred third variant, the first beam shaping optical unit is embodied as adjustable parallel to the first optical axis and the second beam shaping optical unit is embodied as adjustable parallel to the second optical axis. A laser system according to the invention in which the first and second beam shaping optical units are adjustable parallel to the first and the second optical axis, respectively, has a larger range of adjustment by comparison with laser systems in which the first or second beam shaping optical unit is adjustable. By virtue of the adjustable first beam shaping optical unit and the adjustable second beam shaping optical unit, the angle of incidence of the ring beam upstream of the conical mirror and the orientation of the propagation plane in which the laser beam passes downstream of the conical mirror can be altered. The aim is to generate by means of the conical mirror a propagation plane that extends perpendicularly to the cone axis. The orientation of the propagation plane is defined by the angle of reflection of the laser beam, which is dependent on the angle of incidence of the ring beam.

In a further development, the laser system comprises a third beam shaping optical unit embodied as a focusing optical unit and having a third optical axis. A focusing optical unit is defined as an optical element which has a finite focal length and focusses an impinging laser beam, wherein the beam diameter of the laser beam is minimal in the focus position. The extension of the laser system according to the invention by a focusing optical unit has the advantage that the beam diameter of the laser beam can be adapted. A focused laser beam has a smaller beam diameter than a non-focused laser beam in the region of the focus position. The smaller beam diameter has the advantage that the first beam shaping optical unit, the second beam shaping optical unit and the conical mirror can have smaller dimensions. Moreover, the diffraction grating can have a coarser grating structure, which simplifies the production of the diffraction grating or enables production at lower production costs.

Particularly preferably, the focusing optical unit is arranged in the beam path of the laser beam upstream of the second beam shaping optical unit. The arrangement of the focusing optical unit upstream of the second beam shaping optical unit, embodied in particular as a diffraction grating, has the advantage that as a result of the focusing of the laser beam, diffraction gratings having a coarser grating structure can be used, which simplifies the production of the diffraction grating. Moreover, the laser beam has a smaller beam diameter, as a result of which the first beam shaping optical unit, the second beam shaping optical unit and the conical mirror can have smaller dimensions.

Particularly preferably, the focusing optical unit is adjustable parallel to the third optical axis. A third beam shaping optical unit that is adjustable parallel to the third optical axis has the advantage that the angle of reflection of the ring beam and the orientation of the propagation plane in which the laser beam passes downstream of the conical mirror can be altered. The aim is to generate by means of the conical mirror a propagation plane that extends perpendicularly to the cone axis. The orientation of the propagation plane is defined by the angle of reflection of the laser beam, which is dependent on the angle of incidence of the ring beam.

In a preferred embodiment, the laser beam generated by the laser beam source has a beam distribution in the form of a Gaussian distribution, a Lorentz distribution or a Bessel distribution. These beam distributions have no abrupt jump in intensity. An abrupt jump in intensity, such as occurs in the case of a Top Hat distribution, for example, results in undesired diffraction effects at the conical mirror which prevent a sharp delimitation of a linear laser marking on a projection surface. A laser beam source that generates a laser beam with a beam distribution in the form of a Gaussian distribution, Lorentz distribution or Bessel distribution supports the generation of a sharply delimited linear laser marking on a projection surface.

BRIEF DESCRIPTION OF THE DRAWINGS

Exemplary embodiments of the invention are described hereinafter with reference to the drawing. It is not necessarily intended for this to illustrate the exemplary embodiments to scale; rather, the drawing is produced in a schematic and/or slightly distorted form where this is useful for explanation purposes. It should be taken into account here that various modifications and alterations relating to the form and detail of an embodiment may be undertaken without departing from the general concept of the invention. The general concept of the invention is not limited to the exact form or the detail of the preferred embodiment shown and described hereinafter or limited to subject matter that would be limited compared to the subject matter claimed in the claims. For given dimensioning ranges, values within the stated limits should also be disclosed as limit values and can be used and claimed as desired. For the sake of simplicity, identical reference signs are used hereinafter for identical or similar parts or parts having identical or similar functions.

In the Figures.

DETAILED DESCRIPTION

Figure 1:
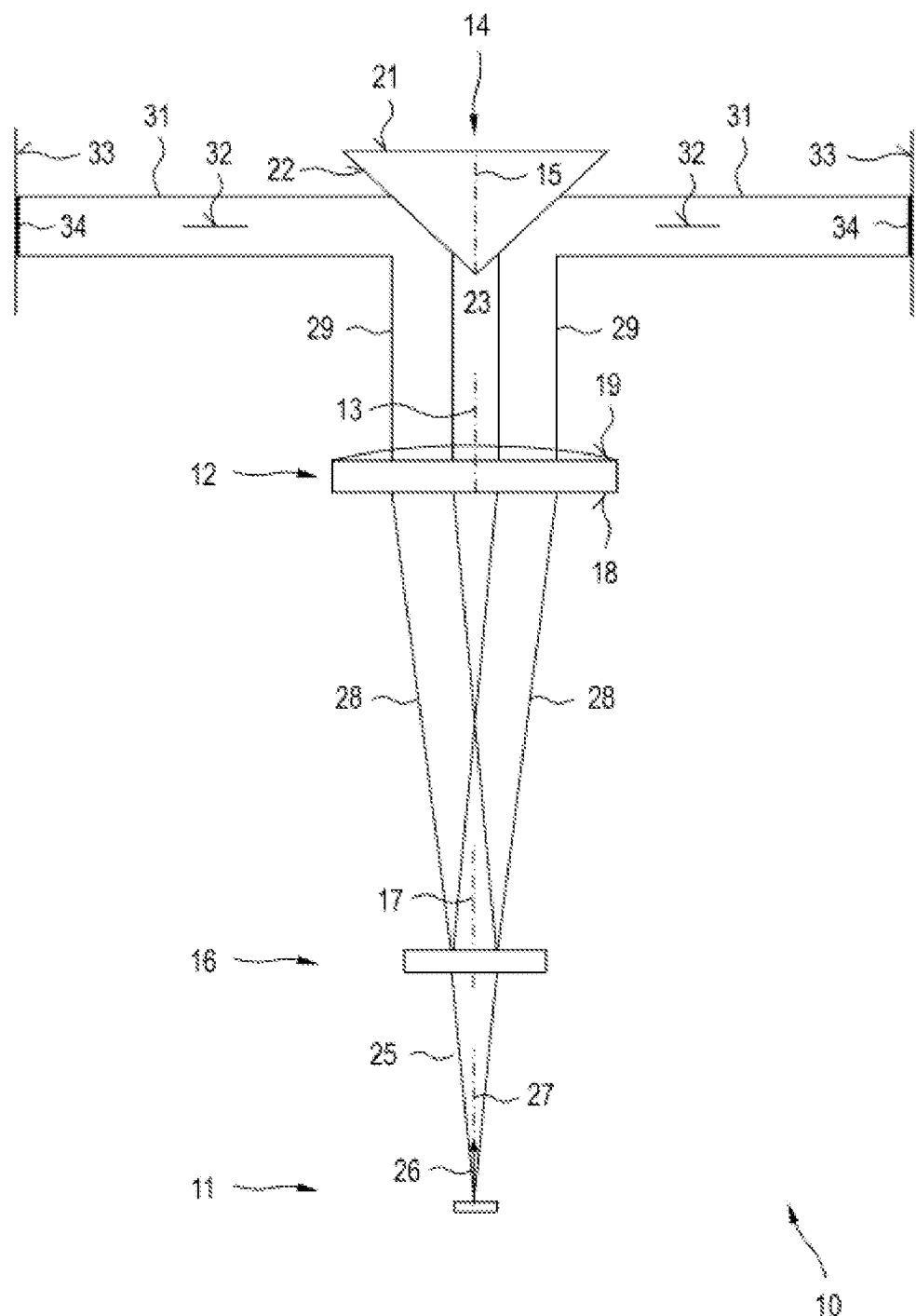
FIG. 1 shows a first embodiment of a laser system according to the invention comprising a laser beam source, a diffraction grating, a collimation optical unit and a conical mirror.

FIG. 1 shows a first embodiment of a laser system 10 according to the invention for generating a linear laser marking on a projection surface. The laser system 10, which is designated hereinafter as first laser system 10, comprises a laser beam source 11, a first beam shaping optical unit 12 having a first optical axis 13, a conical mirror 14 having a cone axis 15, and a second beam shaping optical unit 16 having a second optical axis 17. The first beam shaping optical unit 12 is embodied as a collimation optical unit and the second beam shaping optical unit 16 is embodied as a diffraction grating. The components of the first laser system 10 are arranged in the order: laser beam source 11, second beam shaping optical unit 16, first beam shaping optical unit 12 and conical mirror 14. In this case, the first optical axis 13 of the first beam shaping optical unit 12, the second optical axis 17 of the second beam shaping optical unit 16 and the cone axis 15 of the conical mirror 14 are arranged coaxially with respect to one another.

The laser beam source 11 can be embodied as a semiconductor laser having a wavelength in the visible spectrum, for example as a red semiconductor laser having a wavelength of 635 nm or as a green semiconductor laser having a wavelength of between 510 and 555 nm. The properties of the further optical components 12, 14, 16 of the first laser system 10 are adapted to the wavelength of the laser beam source 11.

The second beam shaping optical unit 16 embodied as a diffraction grating is arranged downstream of the laser beam source 11, beam shaping being effected at said second beam shaping optical unit. The second beam shaping optical unit 16 can be embodied as a diffraction grating having concentric diffraction structures. The properties of the diffraction grating 16 are adapted to the wavelength of the laser beam source 11; the laser beam can be reshaped by means of the parameters "grating shape", "grating width" and "grating height" of the diffraction grating. The second optical axis 17 of the diffraction grating 16 is defined as a straight line which runs through the center of the concentric diffraction structures and is perpendicular to the surface of the diffraction grating 16.

The first beam shaping optical unit 12 embodied as a collimation optical unit is arranged downstream of the diffraction grating 16, beam shaping being effected at said first beam shaping optical unit. The collimation optical unit 12 has a plane entrance surface 18 and a curved exit surface 19. Alternatively, the entrance surface 18 can be embodied as a curved surface and the exit surface 19 as a plane surface, or the entrance and exit surfaces 18, 19 are embodied as curved surfaces. The first optical axis 13 of the collimation optical unit 12 is defined as a straight line which runs through the center of curvature of the curved surface and is perpendicular to the plane surface or, in the case of two curved surfaces, runs through the centers of curvature of the curved surfaces.

Each beam shaping optical unit has an optical axis, the orientation of which is dependent on the light-refracting entrance surface and the light-refracting exit surface. In the case of a beam shaping optical unit having a curved first surface and a curved second surface, the optical axis is defined as a straight line which runs through the first center of curvature of the first surface and through the second center of curvature of the second surface. In the case of a beam shaping optical unit having a curved surface and a plane surface, the optical axis is defined as a straight line which runs through the center of curvature of the curved surface and perpendicularly to the plane surface.

The conical mirror 14 is arranged downstream of the collimation optical unit 12. The conical mirror 14 is embodied as a section of a right cone. A cone is bounded by a base surface and a lateral surface, wherein the base surface is arranged perpendicular to the cone axis in the case of a right cone. The surface area of the conical mirror 14 comprises a circular base surface 21, a lateral surface 22 and a cone vertex 23, wherein the cone axis 15 is arranged perpendicular to the base surface 21 and runs through the cone vertex 23. The lateral surface 22 is embodied as a reflective lateral surface for the wavelength of the laser beam source 11 and a laser beam impinging on the lateral surface 22 is predominantly reflected at the lateral surface 22. The reflectance of the lateral surface 22 is dependent, inter alia, on the angle of incidence and the polarization of an impinging laser beam and on the refractive index of the conical mirror 15.

The laser beam source 11 generates a divergent laser beam 25, which is emitted along a propagation direction 26 and is directed onto the diffraction grating 16. Without an additional optical element in the laser beam source 11, the laser beam 25 is divergent. The axis of symmetry of the beam distribution is defined as the optical axis 27 of the laser beam 25. The laser beam 25 has a beam distribution in the form of a Gaussian distribution, a Lorentz distribution or a Bessel distribution. These beam distributions have no abrupt jump in intensity and support the generation of a sharply delimited linear laser marking on a projection surface.

The divergent laser beam 25 impinges on the diffraction grating 16, which reshapes the laser beam 25 into a divergent ring beam 28 having an intensity minimum in the center of the beam. In order to generate such a ring beam 28 having an intensity minimum in the center of the beam, the diffraction grating 16 can be designed such that the zeroth order of diffraction of the laser beam and the higher even orders of diffraction are suppressed. Alternatively, the diffraction grating 16 can be designed such that the first order of diffraction of the laser beam is amplified and the other orders of diffraction are suppressed.

The divergent ring beam 28 impinges on the collimation optical unit 12, which reshapes the divergent ring beam 28 into a collimated ring beam 29, which is directed onto the conical mirror 14. The collimated ring beam 29 impinges on the lateral surface 22 of the conical mirror 14. The collimated ring beam 29 is deflected at the lateral surface 22 of the conical mirror 14, and the conical mirror 14 generates a laser beam 31 that propagates in a propagation plane 32 and generates a linear laser marking 34 with an opening angle of 360° on a projection surface 33.

In the exemplary embodiment, the optical axis 27 of the laser beam 25, the second optical axis 17 of the second beam shaping optical unit 16, the first optical axis 13 of the first beam shaping optical unit 12 and the cone axis 15 of the conical mirror 14 are arranged coaxially with respect to one another. By virtue of the coaxial arrangement of the components of the first laser system 10, the intensity minimum of the ring beam 28 lies on the cone axis 15 and diffraction effects at the cone vertex 23 of the conical mirror 14 are reduced.

In order that the impinging laser beam is reflected as fully as possible at the lateral surface 22 of the conical mirror 14, the angle of incidence of the laser beam should satisfy the condition of total reflection. The reflected portion can alternatively or additionally be increased by the lateral surface 22 being provided with a highly reflective coating. The higher the reflected portion of the laser beam, the greater the intensity and the better the visibility of the linear laser marking 34 on the projection surface 33.

In the exemplary embodiment in FIG. 1, the collimation optical unit 12 is arranged downstream of the diffraction grating 16. Alternatively, the collimation optical unit 12 can also be arranged upstream of the diffraction grating 16. The arrangement of the collimation optical unit 12 downstream of the diffraction grating 16 has the advantage that a propagation plane 32, which does not extend perpendicular to the cone axis 15 and in which the laser beam 31 passes downstream of the conical mirror 14 can be corrected by means of the collimation optical unit 12. The orientation of the propagation plane 32 is defined by the angle of reflection of the laser beam 31, which is dependent on the angle of incidence of the collimated ring beam 29 on the lateral surface 22 of the conical mirror 14. The angle of incidence of the ring beam 29 can be altered by means of the position of the collimation optical unit 12. In order to alter the position, the collimation optical unit 12 is embodied as adjustable parallel to the first optical axis 13.

Figure 2:
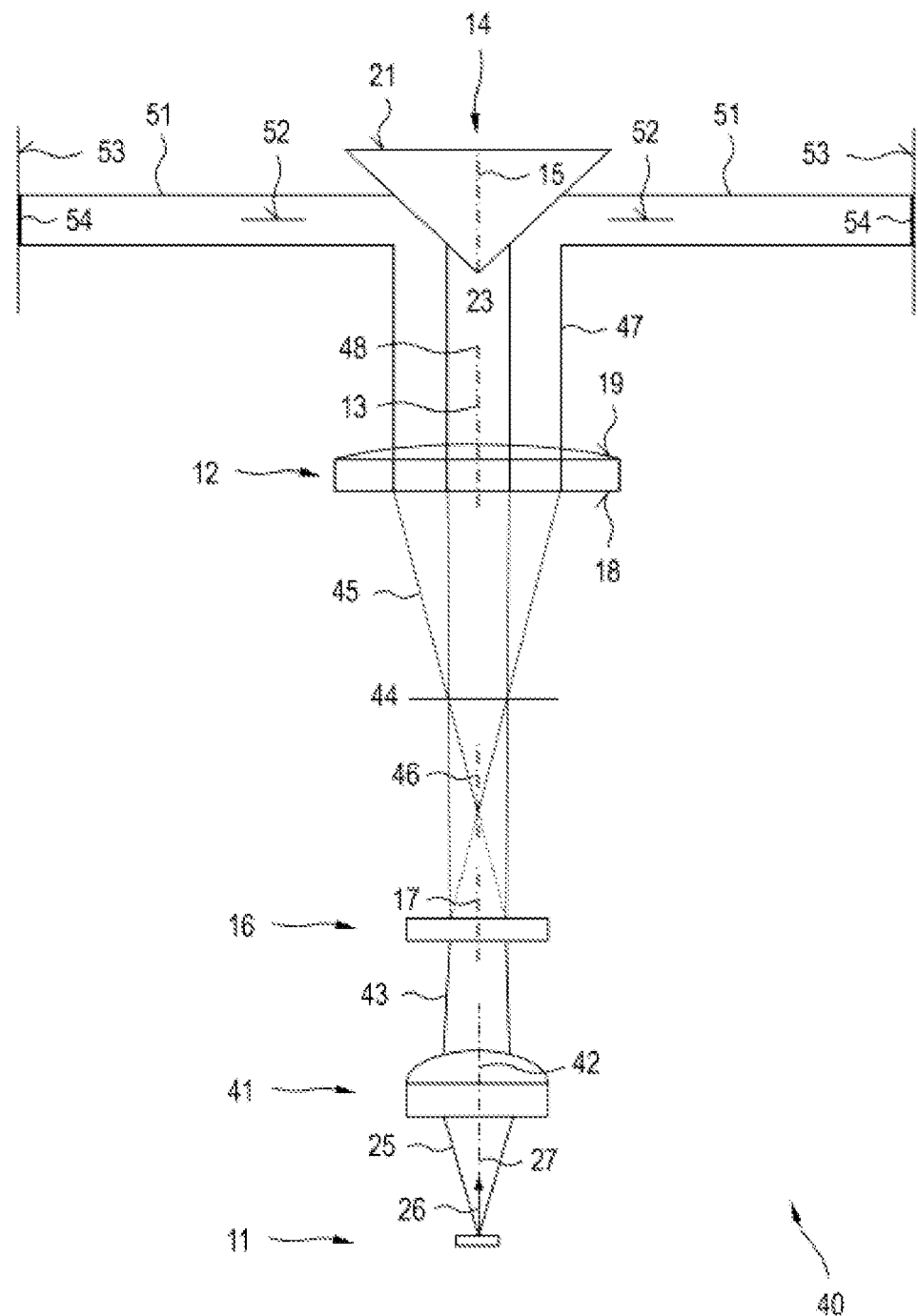
FIG. 2 shows a second embodiment of a laser system according to the invention, which laser system differs from the first embodiment of the laser system by virtue of a focusing optical unit.

FIG. 2 shows a second embodiment of a laser system 40 according to the invention for generating a linear laser marking on a projection surface. The laser system 40 in FIG. 2, which is designated hereinafter as second laser system 40, differs from the first laser system 10 from FIG. 1 by virtue of a third beam shaping optical unit 41 having a third optical axis 42, wherein the third beam shaping optical unit 41 is embodied as a focusing optical unit in the exemplary embodiment.

The second laser system 40 comprises the laser beam source 11, the first beam shaping optical unit 12 having the first optical axis 13, the conical mirror 14 having the cone axis 15, the second beam shaping optical unit 16 having the second optical axis 17, and the third beam shaping optical unit 41 having the third optical axis 42. The components of the second laser system 40 are arranged in the order: laser beam source 11, third beam shaping optical unit 41, second beam shaping optical unit 16, first beam shaping optical unit 12 and conical mirror 14. In this case, the first optical axis 13 of the first beam shaping optical unit 12, the second optical axis 17 of the second beam shaping optical unit 16 and the cone axis 15 of the conical mirror 14 are arranged coaxially with respect to one another.

The laser beam source 11 generates the divergent laser beam 25, which is emitted along the propagation direction 26 and is directed onto the focusing optical unit 41. The divergent laser beam 25 impinges on the focusing optical unit 41, which generates a focused laser beam 43 with a focus position 44. The focused laser beam 43 impinges on the diffraction grating 16, which reshapes the laser beam 43 into a ring beam 45 having an intensity minimum in the center of the beam, wherein the center of the beam corresponds to the optical axis 46 of the ring beam 45. The ring beam 45 impinges on the collimation optical unit 12, which reshapes the ring beam 45 into a collimated ring beam 47 having an optical axis 48, said collimated ring beam being directed onto the conical mirror 14. The collimated ring beam 47 is deflected at the lateral surface 22 of the conical mirror 14, and the conical mirror 14 generates a laser beam 51 that propagates in a propagation plane 52 and generates a linear laser marking 54 with an opening angle of 360° on a projection surface 53.

The focusing optical unit 41 is embodied as adjustable parallel to the third optical axis 42. A focusing optical unit 41 that is adjustable parallel to the third optical axis 42 has the advantage that the angle of reflection of the ring beam 47 and the orientation of the propagation plane 52 in which the laser beam passes downstream of the conical mirror 14 can be altered. The aim is to generate by means of the conical mirror 14 a propagation plane 52 which extends perpendicularly to the cone axis 15. The orientation of the propagation plane 52 is defined by the angle of reflection of the laser beam, which is dependent on the angle of incidence of the ring beam 47.

Figure 3:
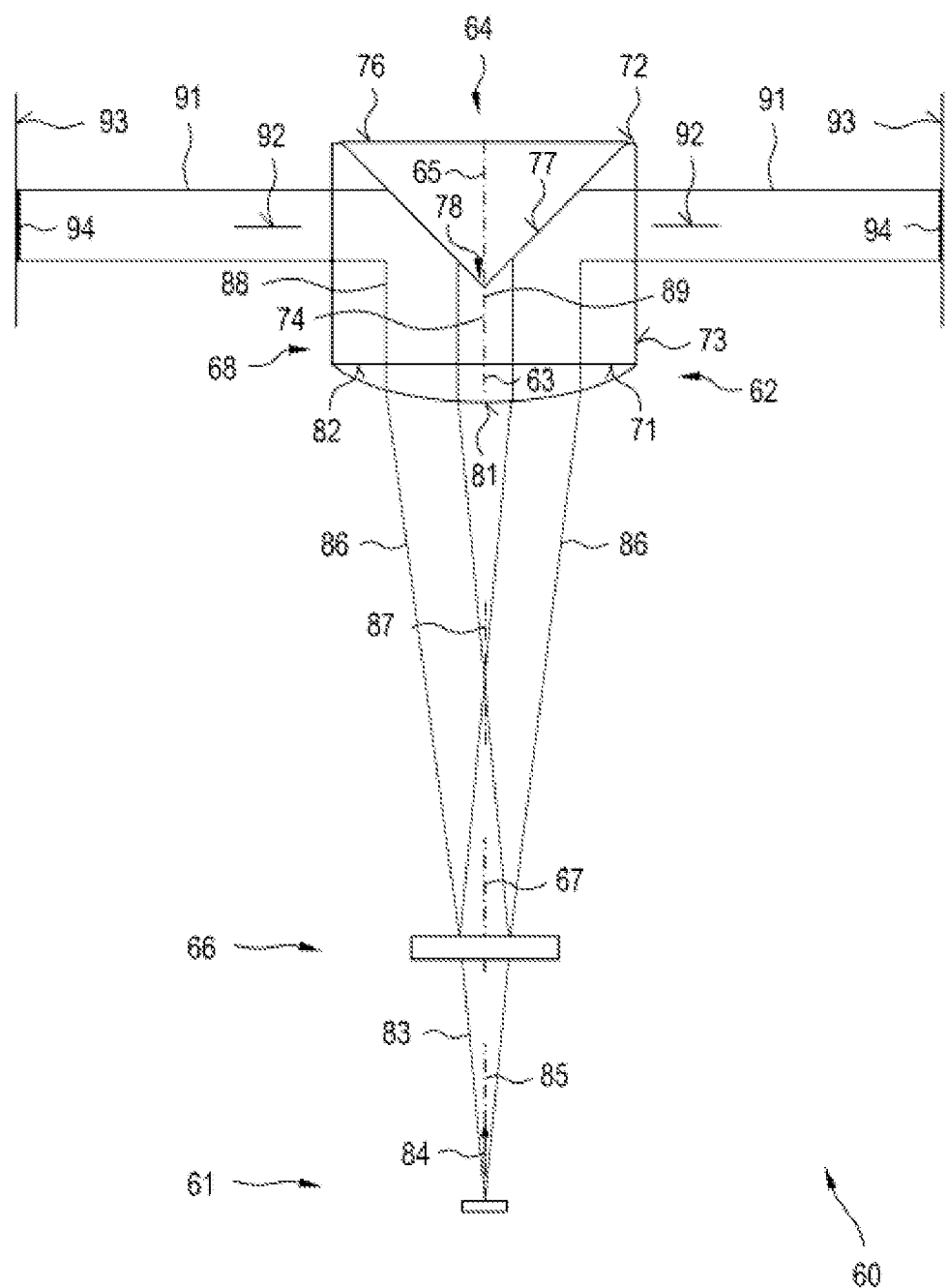
FIG. 3 shows a third embodiment of a laser system according to the invention comprising a laser beam source, a diffraction grating, a collimation optical unit and a conical mirror, wherein the collimation optical unit and the conical mirror are integrated into a common basic body.

FIG. 3 shows a third embodiment of a laser system 60 according to the invention for generating a linear laser marking on a projection surface. The laser system 60, which is designated hereinafter as third laser system 60, comprises a laser beam source 61, a first beam shaping optical unit 62 having a first optical axis 63, a conical mirror 64 having a cone axis 65, and a second beam shaping optical unit 66 having a second optical axis 67. The first beam shaping optical unit 62 is embodied as a collimation optical unit and the second beam shaping optical unit 66 is embodied as a diffraction grating. The components of the third laser system 60 are arranged in the order: laser beam source 61, second beam shaping optical unit 66, first beam shaping optical unit 62 and conical mirror 64. In this case, the first optical axis 63 of the first beam shaping optical unit 62, the second optical axis 67 of the second beam shaping optical unit 66 and the cone axis 65 of the conical mirror 64 are arranged coaxially with respect to one another.

The collimation optical unit 62 and the conical mirror 64 are integrated into a common basic body 68 embodied in the form of a right cylinder. A cylinder is bounded by two parallel, plane surfaces, referred to as base surface and top surface, and a lateral surface; in the case of a right cylinder, the base and top surfaces are arranged perpendicular to a cylinder axis. The surface area of the basic body 68 comprises a base surface 71, a top surface 72 arranged parallel to the base surface 71, and a lateral surface 73 connecting the base and top surfaces 71, 72; the base and top surfaces 71, 72 extend perpendicularly to a cylinder axis 74 of the basic body 68.

The base surface 71, the top surface 72 and the lateral surface 73 are embodied as transmission surfaces for the wavelength of the laser beam source 61. The transmittance of a transmission surface is dependent, inter alia, on the angle of incidence and the polarization of the laser beam and the refractive indices of the materials. The transmittance can be increased by the transmission surface being provided with a coating. The higher the transmitted portion of the laser beam, the greater the intensity and the better the visibility of the laser beam on a projection surface.

The collimation optical unit 62 is connected to the base surface 71 of the basic body 68, and the conical mirror 64 is integrated as a conical sector into the top surface 72 of the basic body 68. The basic body 68 with the connected collimation optical unit 62 and the integrated conical mirror 64 can be produced monolithically from one material. Glass and plastics, for example, are suitable as materials for the basic body 68. The collimation optical unit 62 is embodied as an aspherically curved lens in the exemplary embodiment; the aspherical curvature of the collimation optical unit 62 can be produced, in the case of glass, by diamond turning, replica, grinding and polishing or by pressing at high temperatures from a glass compact body and, in the case of plastic, by injection molding or injection compression molding.

The surface area of the conical sector comprises a circular base surface 76 arranged perpendicular to the cone axis 65, a lateral surface 77 adjoining the base surface 76, and a cone vertex 78. The base surface 76 is arranged on the top surface 72 of the basic body 68 and the cone axis 65 runs collinearly with respect to the cylinder axis 74, such that the cone vertex 78 lies on the cylinder axis 74.

The lateral surface 77 of the conical sector 75 is embodied as a reflection surface for the wavelength of the laser beam source 61. The reflectance of the lateral surface 77 is dependent, inter alia, on the angle of incidence and the polarization of the laser beam and on the refractive index of the basic body 68. In order that the incident laser beam is reflected as fully as possible at the lateral surface 77, the angle of incidence should satisfy the condition of total reflection. The reflected portion can alternatively or additionally be increased by the lateral surface 77 being provided with a highly reflective coating. The higher the reflected portion of the laser beam, the greater the intensity and the better the visibility of the linear laser marking on the projection surface.

The collimation optical unit 62 is integrated into the base surface 71 of the basic body 68. The collimation optical unit 62 has a curved entrance surface 81 and a plane exit surface 82. The first optical axis 63 of the collimation optical unit 62 is defined as a straight line that runs through the center of curvature of the curved surface and is perpendicular to the plane surface.

The laser beam source 61 generates a divergent laser beam 83, which propagates along a propagation direction 84 and is directed onto the diffraction grating 66. The axis of symmetry of the beam distribution is defined as the optical axis 85 of the laser beam. The laser beam 83 has a beam distribution in the form of a Gaussian distribution, a Lorentz distribution or a Bessel distribution. These beam distributions have no abrupt jump in intensity and support the generation of a sharply delimited linear laser marking on a projection surface.

The divergent laser beam 83 impinges on the diffraction grating 66, which reshapes the laser beam 83 into a ring beam 86 having an intensity minimum in the center of the beam, wherein the center of the beam corresponds to the optical axis 87 of the ring beam 86. The divergent ring beam 86 propagates along the propagation direction 84 and impinges on the collimation optical unit 62. The collimation optical unit 62 reshapes the divergent ring beam 86 into a collimated ring beam 88 having an optical axis 89, said collimated ring beam being directed onto the conical mirror 64. The collimated ring beam 88 is deflected at the lateral surface 77 of the conical mirror 64, and the conical mirror 64 generates a laser beam 91 that propagates in a propagation plane 92. The laser beam 91 impinges on the lateral surface 77 of the basic body 68 and leaves the basic body 68. The laser beam 91 impinges on a projection surface 93 and generates a linear laser marking 94 with an opening angle of 360°.

Figure 4:
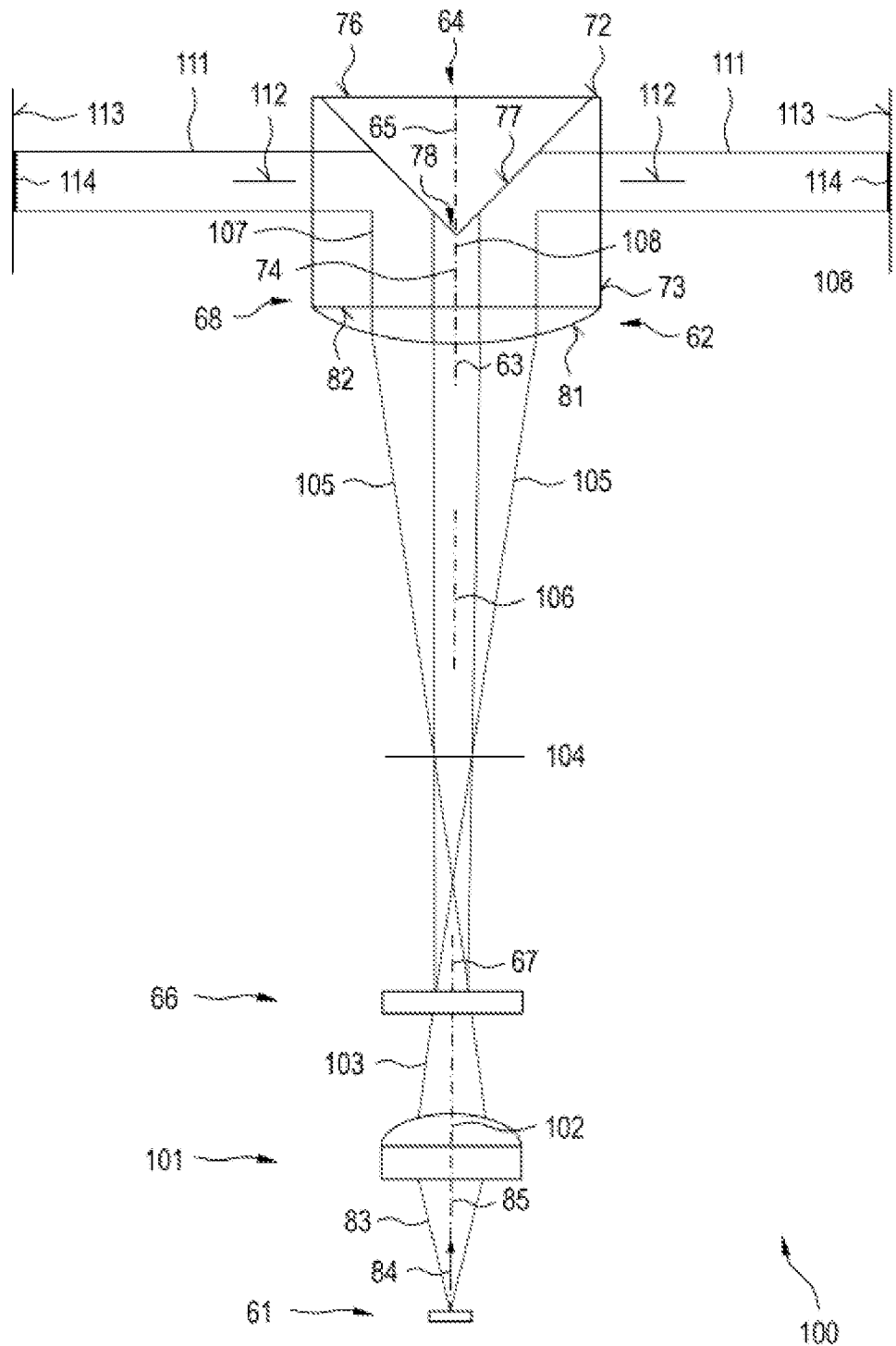
FIG. 4 shows a fourth embodiment of a laser system according to the invention, which laser system differs from the third embodiment of the laser system by virtue of a focusing optical unit.

FIG. 4 shows a fourth embodiment of a laser system 100 according to the invention for generating a linear laser marking on a projection surface. The laser system 100 in FIG. 4, which is designated hereinafter as fourth laser system 100, differs from the third laser system 60 from FIG. 3 by virtue of a third beam shaping optical unit 101 having a third optical axis 102, wherein the third beam shaping optical unit 101 is embodied as a focusing optical unit in the exemplary embodiment.

The fourth laser system 100 comprises the laser beam source 61, the first beam shaping optical unit 62 having the first optical axis 63, the conical mirror 64 having the cone axis 65, the second beam shaping optical unit 66 having the second optical axis 67, and the third beam shaping optical unit 101 having the third optical axis 102. The components of the fourth laser system 100 are arranged in the order: laser beam source 61, third beam shaping optical unit 101, second beam shaping optical unit 66, first beam shaping optical unit 62 and conical mirror 64. In this case, the first optical axis 63 of the first beam shaping optical unit 62, the second optical axis 67 of the second beam shaping optical unit 66 and the third optical axis 102 of the third beam shaping optical unit 101 are arranged coaxially with respect to one another.

The laser beam source 61 generates the divergent laser beam 83, which is emitted along the propagation direction 84 and is directed onto the focusing optical unit 101. The divergent laser beam 83 impinges on the focusing optical unit 101, which generates a focused laser beam 103 with a focus position 104. The focused laser beam 103 impinges on the diffraction grating 66, which reshapes the laser beam into a ring beam 105 having an intensity minimum in the center of the beam, wherein the center of the beam corresponds to the optical axis 106 of the ring beam 105. The divergent ring beam 105 impinges on the collimation optical unit 62, which reshapes the divergent ring beam 105 into a collimated ring beam 107 having an optical axis 108, said collimated ring beam being directed onto the conical mirror 64. The collimated ring beam 107 is deflected at the lateral surface 77 of the conical mirror 64, and the conical mirror 64 generates a laser beam 111 that propagates in a propagation plane 112. The laser beam 111 impinges on the lateral surface 77 of the basic body 68 and leaves the basic body 68. The laser beam 111 impinges on a projection surface 113 and generates a linear laser marking 114 with an opening angle of 360°.

The focusing optical unit 101 is embodied as adjustable parallel to the third optical axis 102. A focusing optical unit 101 that is adjustable parallel to the third optical axis 102 has the advantage that the angle of reflection of the ring beam 107 and the orientation of the propagation plane 112 in which the laser beam passes downstream of the conical mirror 64 can be altered. The aim is to generate by means of the conical mirror 64 a propagation plane 112 that extends perpendicularly to the cone axis 65. The orientation of the propagation plane 112 is defined by the angle of reflection of the laser beam, which is dependent on the angle of incidence of the ring beam 107.

Figure 5A:
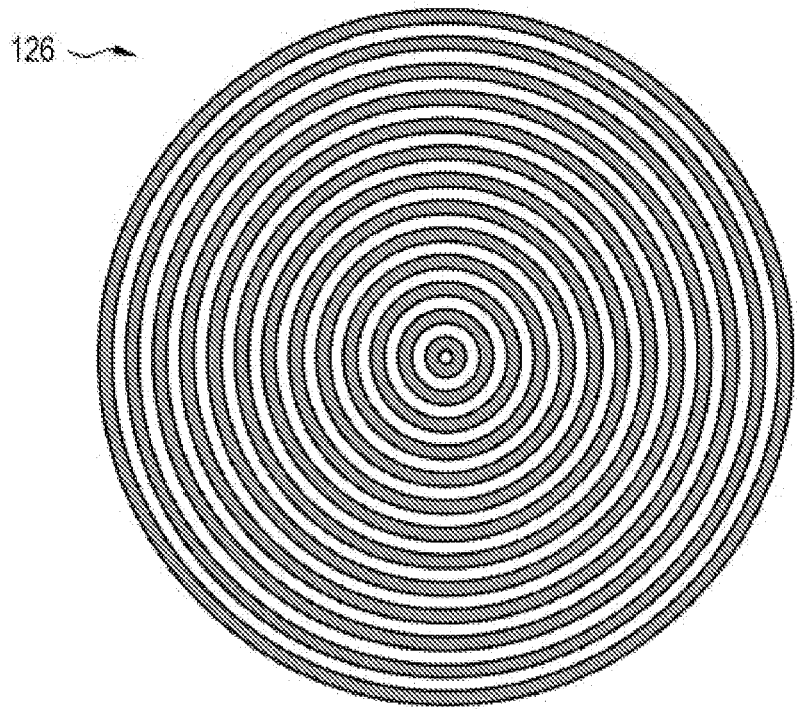
FIGS. 5A, B show an embodiment of the diffraction grating of the laser systems from FIG. 1 and FIG. 3.
Figure 5B:
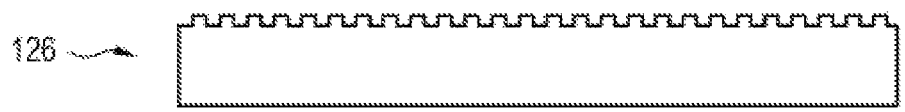

FIGS. 5A, B show a diffraction grating 126 that can replace the diffraction grating 16 of the first laser system 10 from FIG. 1 and/or the diffraction grating 66 of the third laser system 60 from FIG. 3. In this case, FIG. 5A shows the diffraction grating 126 in a plan view and FIG. 5B shows a cross section.

The task of the diffraction grating 126 is to reshape the laser beam emitted by the laser beam source 11, 61 into a ring beam having an intensity minimum in the center of the beam. The ring beam subsequently impinges on a conical mirror, which deflects the ring beam and reshapes it into a laser beam that propagates in a propagation plane. The intensity minimum of the ring beam affords the possibility of reducing diffraction effects at the cone vertex of the conical mirror. To that end, the ring beam should be oriented such that the intensity minimum of the ring beam coincides with the cone vertex of the conical mirror.

The diffraction grating 126 has concentric diffraction structures. The properties of the diffraction grating 126 are adapted to the wavelength of the laser beam source 11, 61 and the beam diameter of the laser beam by means of the parameters "grating shape", "grating width" and "grating height".

What is claimed is:

1. A laser system for generating a linear laser marking on a projection surface, the laser system comprising:
    a laser beam source generating a laser beam and emitting the laser beam along a propagation direction;
    a first beam shaping optical unit embodied as a collimation optical unit and having a first optical axis;
    a conical mirror embodied as a right cone having a cone axis and a reflective lateral surface, wherein the conical mirror is arranged in a beam path of the laser beam downstream of the collimation optical unit and the cone axis is oriented parallel to the first optical axis; and
    a second beam shaping optical unit having a second optical axis, wherein the second beam shaping optical unit is arranged in the beam path of the laser beam upstream of the conical mirror and reshapes the laser beam into a ring beam having an intensity minimum in a center of the beam.

2. The laser system as recited in claim 1 wherein second optical axis of the second beam shaping optical unit is arranged coaxially with respect to the cone axis of the conical mirror.

3. The laser system as recited in claim 1 wherein the second beam shaping optical unit is embodied as a diffraction grating.

4. The laser system as recited in claim 1 wherein the second beam shaping optical unit is arranged in the beam path of the laser beam between the laser beam source and the first beam shaping optical unit.

5. The laser system as recited in claim 4 wherein the first beam shaping optical unit is embodied as adjustable parallel to the first optical axis.

6. The laser system as recited in claim 4 wherein the second beam shaping optical unit is embodied as adjustable parallel to the second optical axis.

7. The laser system as recited in claim 4 wherein the first beam shaping optical unit is embodied as adjustable parallel to the first optical axis and the second beam shaping optical unit is embodied as adjustable parallel to the second optical axis.

8. The laser system as recited in claim 1 further comprising a third beam shaping optical unit embodied as a focusing optical unit and having a third optical axis.

9. The laser system as recited in claim 8 wherein the focusing optical unit is arranged in the beam path of the laser beam upstream of the second beam shaping optical unit.

10. The laser system as recited in claim 8 wherein that the focusing optical unit is adjustable parallel to the third optical axis.

11. The laser system as recited in claim 1 wherein laser beam generated by the laser beam source has a beam distribution in the form of a Gaussian distribution, a Lorentz distribution or a Bessel distribution.

* * * * *